(12) United States Patent
Lott et al.

(10) Patent No.: US 8,559,359 B2
(45) Date of Patent: Oct. 15, 2013

(54) INFORMATION EXCHANGE MECHANISMS TO ACHIEVE NETWORK QOS IN WIRELESS CELLULAR SYSTEMS

(75) Inventors: Christopher G. Lott, San Diego, CA (US); Amir Farajidana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 850 days.

(21) Appl. No.: 12/431,416

(22) Filed: Apr. 28, 2009

(65) Prior Publication Data

US 2009/0268684 A1    Oct. 29, 2009

Related U.S. Application Data

(60) Provisional application No. 61/048,905, filed on Apr. 29, 2008.

(51) Int. Cl.
    *H04B 7/185*    (2006.01)
(52) U.S. Cl.
    USPC ............ 370/318; 370/329; 370/349; 370/352
(58) Field of Classification Search
    USPC .................................................. 370/329, 318
    See application file for complete search history.

(56) References Cited

U.S. PATENT DOCUMENTS

| | | | | |
|---|---|---|---|---|
| 6,169,898 B1* | 1/2001 | Hsu et al. | ................... | 455/432.3 |
| 6,298,219 B1* | 10/2001 | Patronen et al. | ............... | 455/424 |
| 6,771,934 B2* | 8/2004 | Demers et al. | ................ | 455/63.1 |
| 7,417,963 B2* | 8/2008 | Chen et al. | .................... | 370/311 |
| 7,599,699 B2* | 10/2009 | Lastinger et al. | .......... | 455/452.2 |
| 7,684,366 B2* | 3/2010 | Cheng et al. | .................. | 370/329 |
| 8,000,284 B2* | 8/2011 | Lott et al. | ...................... | 370/318 |
| 8,060,103 B2* | 11/2011 | Sung | .............................. | 455/446 |
| 8,270,357 B1* | 9/2012 | Srinivas et al. | ............... | 370/329 |
| 2002/0061031 A1* | 5/2002 | Sugar et al. | ................... | 370/466 |
| 2005/0117533 A1* | 6/2005 | Cave | ............................. | 370/321 |
| 2006/0209721 A1* | 9/2006 | Mese et al. | .................... | 370/254 |
| 2006/0215612 A1* | 9/2006 | Chemiakina et al. | ......... | 370/332 |

(Continued)

FOREIGN PATENT DOCUMENTS

| | | |
|---|---|---|
| CN | 1304624 A | 7/2001 |
| CN | 1636416 A | 7/2005 |

(Continued)

OTHER PUBLICATIONS

Alcatel-Lucent; (On the Overload Indicator Interworking with ICIC);2008;3GPP TSG-RAN WG-1; pp. 1-7.*

(Continued)

*Primary Examiner* — Ricky Ngo
*Assistant Examiner* — Dewanda Samuel
(74) *Attorney, Agent, or Firm* — François A. Pelaez

(57) ABSTRACT

Systems and methodologies are described that facilitate quality of service (QoS) differentiation and/or prioritization across a plurality of base stations included in wireless communication systems. The system can include components and/or devices that obtain resource allocations for cells controlled by a local base station, ascertains whether or not the resource allocations satisfy quality of service targets associated with data flows traversing through cells controlled by the local base station, and dispatches inter cell interference coordination indicators to remote base stations that have a proximate relationship defined by an X2 channel between the local base station and the remote base stations.

35 Claims, 11 Drawing Sheets

(56) References Cited

U.S. PATENT DOCUMENTS

| | | | |
|---|---|---|---|
| 2006/0239224 A1* | 10/2006 | Borst et al. | 370/329 |
| 2007/0077957 A1* | 4/2007 | Pedersen | 455/522 |
| 2007/0105561 A1* | 5/2007 | Doetsch et al. | 455/450 |
| 2008/0095133 A1* | 4/2008 | Kodo et al. | 370/342 |
| 2008/0125136 A1* | 5/2008 | Song et al. | 455/452.1 |
| 2009/0179755 A1* | 7/2009 | Bachl et al. | 340/540 |
| 2010/0151876 A1* | 6/2010 | Park et al. | 455/452.2 |
| 2011/0105135 A1* | 5/2011 | Krishnamurthy et al. | 455/450 |

FOREIGN PATENT DOCUMENTS

| | | |
|---|---|---|
| EP | 0841827 A2 | 5/1998 |
| EP | 1892972 A1 | 2/2008 |
| JP | 2003199144 A | 7/2003 |
| JP | 2008079280 A | 4/2008 |
| RU | 2005131960 A | 5/2006 |
| WO | 2004084509 | 9/2004 |
| WO | WO 2006087797 A1 | 8/2006 |

OTHER PUBLICATIONS

3GPP TR 25.814 V7.1.0, Technical Report, "3rd Generation Partnership Project, Technical Specification Group Radio Access Network, Physical layer aspects for evolved Universal Terrestrial Radio Access (UTRA) (Release 7)", 3GPP TR 25.814 V7.1.0, [Online] vol. 25.814, No. V7.1.0, Sep. 1, 2006, pp. 1-133.

International Search Report and Written Opinion—PCT/US2009/042159—ISA/EPO—Sep. 18, 2009.

Vodafone: "QoS Support based on Intercell Interference Coordination", 3GPP TSG RAN WG2#60 R2-075030, Jeju, Korea, Nov. 5-9, 2007, pp. 1-2.

Taiwan Search Report—TW098114271—TIPO—Dec. 3, 2012.

* cited by examiner

INFORMATION EXCHANGE MECHANISMS TO ACHIEVE NETWORK QOS IN WIRELESS CELLULAR SYSTEMS

CLAIM OF PRIORITY UNDER 35 U.S.C. §119

The present application for patent claims priority to Provisional Application No. 61/048,905, entitled "A METHOD AND APPARATUS FOR FULL QoS IN A WIRELESS COMMUNICATION SYSTEM", filed Apr. 29, 2008, which is assigned to the assignee hereof and hereby expressly incorporated by reference herein.

BACKGROUND

I. Field

The following description relates generally to wireless communications, and more particularly to methods and systems to that enable quality of service (QoS) differentiation and/or prioritization across multiple base stations within a wireless communications system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$ Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

In recent years, users have started to replace fixed line communications with mobile communications and have increasingly demanded great voice quality, reliable service, and low prices.

In addition to mobile phone networks currently in place, a new class of small base station has emerged, which may be installed in a user's home or office and provide indoor wireless coverage to mobile units using existing broadband Internet connections. Such personal miniature base stations are generally known as access point base stations, or, alternatively, Home Node B (HNB) or femtocells. Typically, such miniature base stations are connected to the Internet and the mobile operator's network via DSL router or cable modem.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding discussion thereof, various aspects are described in connection with effectuating and/or facilitating quality of service (QoS) differentiation and/or prioritization across a plurality of base stations situated in wireless communications network. The claimed subject matter consists of informational signaling mechanisms to achieve network wide quality of service (QoS) targets through base station (or cell) cooperation. A notion of aggregate cell congestion is defined, based on the quality of service (QoS) status of each constituent flow traversing through cells controlled or serviced by a base station. Associated with the aggregate congestion state is an aggregate cell priority, based on the quality of service (QoS) priority levels that already exist for the constituent flows. This congestion information can be passed between cells or base stations that control or service cells, and the messaging can be triggered based on a cell's quality of service (QoS) needs and perceived local network environment. The cell congestion concept based on aggregate cell flow quality of service (QoS) status can be utilized by each base station controlling or servicing cells in a distributed fashion to coordinate overall network resource usage and achieve fair quality of service (QoS) flow behavior across the network.

The claimed subject matter in accordance with various aspects set forth herein provides an apparatus operable in a wireless communication system wherein the apparatus comprises a processor, configured to obtain a current resource allocation for one or more cells controlled by a first base station, ascertain whether the current resource allocation satisfies a quality of service target associated with data flows traversing through at least one of the one or more cells controlled by the first base station, and dispatch an inter cell interference coordination indicator to a second base station, and memory coupled to the processor for persisting data.

Additionally, the claimed subject matter in accordance with further aspects provides various methodologies utilized in wireless communications systems, the method comprising the acts of soliciting a current resource allocation for cells controlled by a first base station, ascertaining whether or not the current resource allocation satisfies quality of service targets associated with data flows traversing through at least one of the cells controlled by the first base station, and disseminating an inter cell interference coordination indicator to a second base station.

Moreover, the claimed subject matter in accordance with yet further aspects set forth herein also provides an apparatus operable in wireless communication systems wherein the apparatus includes memory that retains instructions related to obtaining resource allocations for cells controlled by a first base station, ascertaining whether the resource allocations satisfy quality of service targets associated with data flows traversing through the cells controlled by the first base station, and subsequently or contemporaneously dispatching inter cell interference coordination indicators to a second base station; and processors, coupled to the memory, configured to execute the instructions retained in memory.

Furthermore and in accordance with yet further aspects described herein, the claimed subject matter provides an apparatus operable in wireless communication systems that includes means for obtaining a current resource allocation for cells controlled by a first base station, means for ascertaining whether or not the current resource allocation satisfies a quality of service target associated with data flows traversing through at least one of the one or more cells controlled by the first base station, and means for dispatching inter cell interference coordination indicators to neighboring or proximate base stations.

In addition and in accordance with further aspects elucidated herein, the claimed matter also provides a computer-program product, the computer-program product comprising code for obtaining current resource allocations for cells controlled by a base station, code for ascertaining whether the resource allocations satisfy quality of service targets associated with data flow traversing through the cells controlled by the base station, and code for communicating inter cell interference coordination indicators to neighboring base stations.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
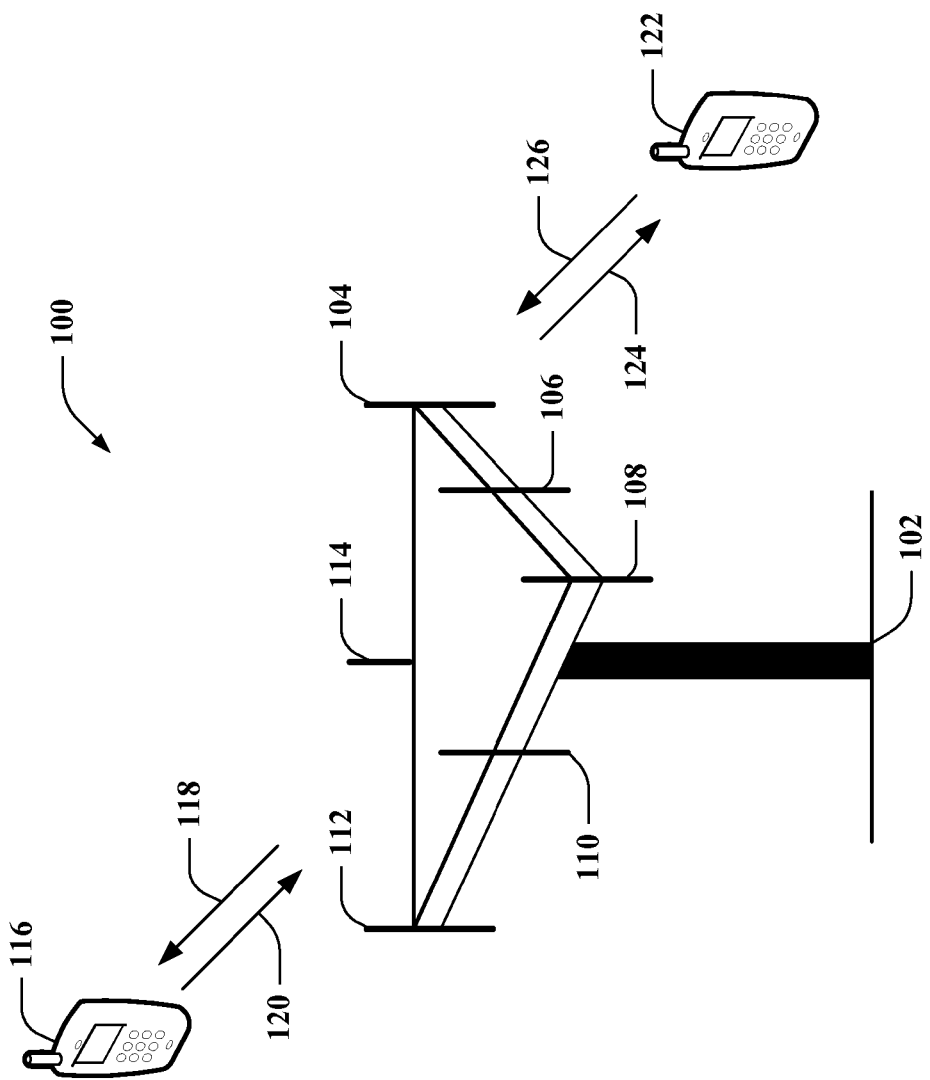
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA.

CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Prior to embarking on an extensive discussion and overview of the claimed subject matter, it should be noted, without limitation or loss of generality, that the while the claimed subject matter is elucidated in terms of the downlink aspects of quality of service (QoS) differentiation and/or prioritization across multiple base stations, the claimed matter with equal facility and/or functionality can have application to the uplink analogs of quality of service (QoS) differentiation and/or prioritization across multiple base stations as well.

Cell edge users can benefit significantly from a reduction in interference power from neighboring cells. Efficiency of cell resource utilization can thus be enhanced if there is cooperation across base stations or eNodeB's, coordinating power use across physical resource blocks (PRBs). Utilization of inter cell interference coordination (ICIC) signaling as employed by the claimed subject matter can create a mechanism that achieves this type of coordination. Groups of cells that successfully coordinate transmissions and/or received transmissions can, as a result, benefit each cell in its overall resource efficiency, making such schemes of value even when no specific relative quality of service (QoS) status is necessarily shared.

Nevertheless, in addition to the aforementioned efficiency gain, it can also be possible to balance quality of service (QoS) requirements across cells through the sharing of quality of service (QoS) status information. This quality of service (QoS) information should be based at least in part on overall cell congestion (e.g., upload (UL) congestion and download (DL) congestion), and should take into account the priority of the congested Radio Bearers or flows of data, thereby enabling resource allocation tradeoffs based on relative quality of service (QoS) priority across cells.

The claimed subject matter in accordance with the various aspects set forth herein, adds a bit field to an inter cell interference coordinator (ICIC) indicator, the bit field defines the highest-priority Radio Bearer or flow that is currently congested in a cell, wherein a state of congestion can typically occur when one of the quality of service (QoS) targets (e.g., delay, guaranteed bit rate, ... ) for the given Radio Bearer or data flow is consistently not being met. The number of bits added to the inter cell interference coordination (ICIC) indicator can be similar to that needed for exactly one priority level. For instance, the number of bits added to the inter cell interference coordination (ICIC) indicator can be the number of bits that are necessary to code at least one 3GPP Rel. 8 quality of service priority (QoS) number. Further there can be one reserved bit that can indicate that no Radio Bearer of flow is currently in congestion. Typically, the inter cell interference coordinator (ICIC) indicator can be triggered anytime there is a change in the highest priority level of a congested Radio Bearer or flow, or when the per-physical resource block (PRB) bit pattern is adjusted, in addition to other triggers that can be defined that are not based directly on quality of service (QoS) considerations.

Figure 2:
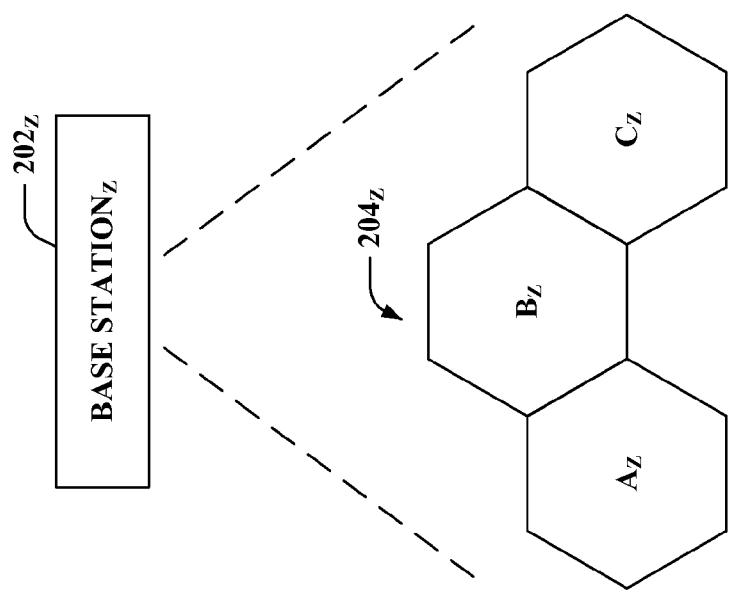
FIG. 2 is an illustration of an example system that effectuates quality of service (QoS) differentiation and/or prioritization across a plurality of base stations situated in a wireless communication environment.
Figure 2:
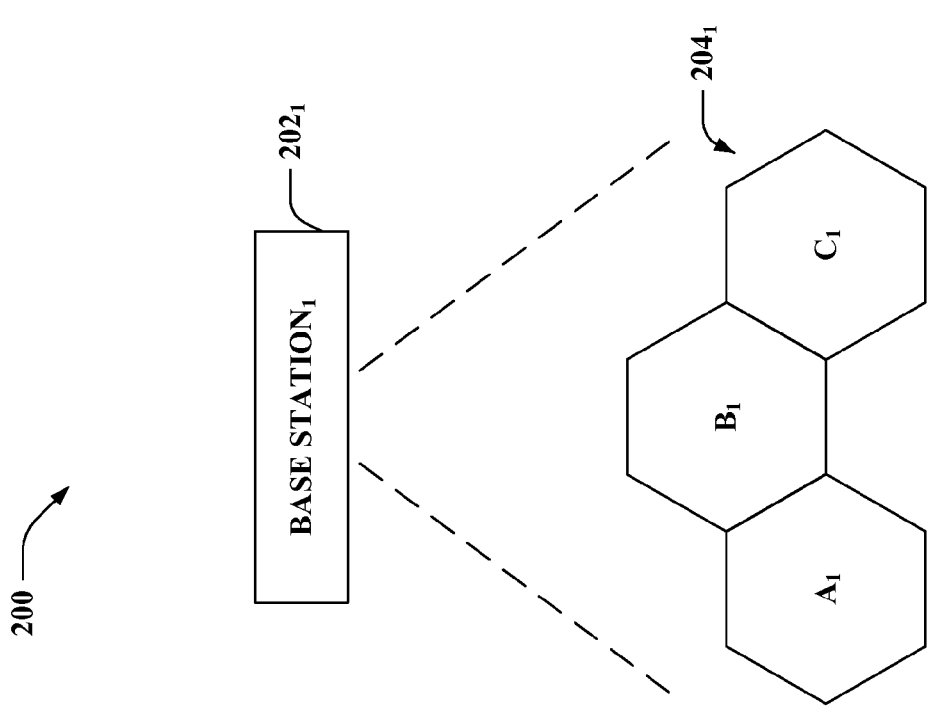

FIG. 2 provides illustration of a system 200 that facilitates and/or effectuates Quality of Service (QoS) differentiation and/or prioritization across a plurality of base stations ($202_1, \ldots, 202_Z$, where Z denotes an integer greater than zero), wherein each of the plurality of base stations ($202_1, \ldots, 202_Z$) are in a proximate relationship with one another such that cells controlled or serviced by each base station can cause interference to cells controlled or serviced by its neighbors during the transmit and/or receive phase of operations. Further as illustrated, base stations ($202_1, \ldots, 202_Z$) can control or service one or more cells, such as cells $204_1$ (e.g., cells $A_1, B_1, C_1, \ldots$) and cells $204_Z$ (e.g., $A_Z, B_Z, C_Z, \ldots$). It should be noted without limitation or loss of generality, that while only three cells have been depicted as being controlled by each of base station $202_1$ and/or base station $202_Z$, a greater or fewer number of cells can be controlled or serviced by its corresponding base station. Additionally, it should further be noted that each of the one or more cells $204_1$ and/or one or more cells $204_Z$ can be divided into one or more sectors comprising further cells. Base station $202_1, \ldots$, base station $202_Z$ can transmit and/or receive information, signals, data, instructions, commands, bits, symbols, and the like. It is also to be appreciated that the term base station as utilized herein can also refer to an access point, Node B, Evolved Node B (e.g., eNodeB, eNB) or referred to by some other terminology. Also, although not depicted, it is to be appreciated that base station $202_1, \ldots$, base station $202_Z$ can be in continuous and/or intermittent correspondence or communication with one or more access terminals or user equipment. Moreover, although not illustrated, it is to be further appreciated, without limitation or loss of generality, that base station $202_1, \ldots$, base station $202_Z$ can be substantially similar. According to an illustration, system 200 can be a Long Term Evolution (LTE) based system; however, the claimed subject matter is not necessarily so limited.

Base stations $202_1, \ldots, 202_Z$, as illustrated through cooperation with one another can obtain efficiency gains and mitigate inter-cellular interference by coordinating power usage across physical resource blocks. Such coordination can be accomplished by utilization of inter cell interference coordination (ICIC) signaling wherein each base station $202_1, \ldots, 202_Z$ controlling its respective cells (e.g., $204_1, \ldots, 204_Z$) can correspond or communicate with one another so that they can coordinate their operations (e.g., transmissions and/or received transmission) in such a manner that enhances overall resource efficiency as well as balancing quality of service (QoS) requirements across cells $202_1, \ldots, 202_Z$ by sharing quality of service (QoS) status information.

Currently, Long Term Evolution (LTE) based systems have a concept of an X2 channel wherein base stations $202_1, \ldots, 202_Z$ can be connected via associated X2 interfaces to one another. However, since the mobility mechanism as conceptualized by the Long Term Evolution (LTE) standard does not include an anchor point in the Long Term Evolution (LTE) Radio Access Network (RAN), the X2 channel/interface can typically only be used between base stations (e.g., $202_1, \ldots, 202_Z$) that have proximate or neighboring cells. Nonetheless, the X2 channel/interface can provide a direct connection between a first base station (e.g., $202_1$) and a second base station (e.g., $202_Z$), wherein the first base station (e.g., $202_1$) controls or services one or more cells $204_1$ (e.g., $A_1, B_1, C_1, \ldots$) that are in a proximate relationship with one or more cells $204_Z$ (e.g., $A_Z, B_Z, C_Z, \ldots$) controlled or serviced by base station $202_Z$ such that the proximate relationship between one or more of the cells $204_1$ or cells $204_Z$ causes inter cell interference. For instance, cell $C_1$ controlled by base station $202_1$ can be adjacent or contiguous to and interfering with transmissions and/or received transmissions to/from cell $A_Z$ controlled by base station $202_Z$.

To date, there have been successful efforts to utilize quality of service (QoS) metrics on an intra-cellular basis (e.g., within cells controlled by the same base station) since access terminals or user equipment when they come within the ambit of cells (e.g., $204_1, \ldots, 204_Z$) controlled or serviced by a base station (e.g., base stations $202_1, \ldots, 202_Z$) are typically assigned or allocated to a single cell based at least in part on signal quality. Central to the success of such efforts has been the role of the scheduler that typically controls resources allocated to Voice over Internet Protocol (VoIP), video, best effort, Hypertext Transfer Protocol (HTTP), and the like. Additionally, the scheduler has generally also been responsible for setting up and handling flows subject to quality of service (QoS) constraints (e.g., controlling the quality of the quality of service (QoS) received by particular flows allocated particular resources), etc. Nevertheless, there are and always have been intrinsic couplings between or across cells (e.g., $204_1, \ldots, 204_Z$) in that cells (e.g., $204_1, \ldots, 204_Z$) controlled by disparate or different base stations (e.g., base stations $202_1, \ldots, 202_Z$) can affect each other by creating/generating interference to each other.

Interference between cells serviced or controlled by different or disparate base stations and the consequent diminution of quality of service (QoS) to flows associated with both interfering cells (e.g., cell $C_1$ and $A_Z$) has nevertheless at the very least been overlooked, discounted, or deprecated given the current overarching operational archetype with respect to intra-cellular centrism. This intra-cellular centrism can be illustrated as follows, wherein base station $202_1$ on perceiving the reduced quality of service (QoS) experienced by flows associated with cell $C_1$ effectuates resource allocations and scheduling schemes to ensure that the flows within cell $C_1$ and subject to the diminution attain their quality of service (QoS)

targets, whereas base station $202_Z$ can actuate other probably dissonant resource allocations and scheduling paradigms to assure that flows associated with cell $A_Z$ can realize their quality of service (QoS) goals. Nevertheless, and as will be appreciated by those moderately adroit in this field of endeavor, the resource allocations and/or scheduling schemes implemented by each of base station $202_1$ and base station $202_Z$ in their respective, individual, and independent endeavors to ensure that local quality of service (QoS) targets associated with data flows (and/or impinged data flows) passing through each of the cells under their respective control, can cause interference to one another; or more succinctly put, each of base station $202_1$ and base station $202_Z$ in its independent endeavors to control and maximize local quality of service (QoS) targets associated with data flows under their respective control causes mutual interference to the other. Accordingly, there currently are no mechanisms to control when and/or how quality of service (QoS) metrics should be applied throughout a wireless cellular system, and especially, when and/or how quality of service (QoS) metrics can be applied with respect to neighboring cells (e.g., $C_1$ and $A_Z$) controlled or serviced by disparate or different base stations (e.g., base station $202_1$ and base station $202_Z$ respectively).

The claimed subject matter, as illustrated in FIG. 2, provides a network wide quality of service (QoS) mechanism rather than a cell centric quality of service (QoS) mechanism. It should be noted without limitation or loss of generality that the claimed subject does not supplant the current cell centric quality of service (QoS) mechanism, but rather augments or provides an adjunct to the current quality of service (QoS) mechanism, whereby base stations (e.g., base stations $202_1, \ldots, 202_Z$) can coordinate their resource allocations and/or scheduling schemes in a manner that reduces or mitigates inter-cell/cross cell interference where the interfering cells are controlled by different but proximate base stations.

Implementation of the claimed subject matter can thus lead to efficiency improvement through interference avoidance. For instance, resource allocations and/or scheduling policies, implemented by base station $202_1$ with respect to cell $C_1$ in furtherance of quality of service (QoS) targets associated with various tasks or flows disseminated via $C_1$, can be selected so as not to interfere with the quality of service (QoS) targets associated with the various tasks or flows being dispatched by cell $A_Z$, where cell $A_Z$ is controlled by a disparate base station (e.g., base station $202_Z$). To achieve such efficiency advantages through interference avoidance, base station $202_1$ in reducing inter-cell/cross-cell interference to cell $A_Z$, can identify resource allocations and/or scheduling policies for use by cell $C_1$ that are not inimical with the throughput of flows to meet quality of service (QoS) targets within cell $A_Z$. Similarly, base station $202_Z$ in reducing cross-cell interference to cell $C_1$ controlled or serviced by base station $202_1$ can adopt scheduling policies and resource allocations for use in cell $A_Z$ that are complimentary or concordant with the resource allocations and/or scheduling policies adopted by base station $202_1$ in its servicing or control over cell $C_1$. Thus, for example, base station $202_1$ can decide that in order to meet or exceed the quality of service (QoS) targets for a particular high priority flow in cell $C_1$ that the flow should be broadcast at a first frequency. Base station $202_Z$ in recognition of the high priority flow being dispatched in cell $C_1$ and base station $202_1$'s attempts to satisfy quality of service (QoS) targets associated with this high priority flow, can decide that since the flows associated with cell $A_Z$ do not rise to the same level of priority as those being carried out in cell $C_1$ to broadcast at a second non-interfering frequency. Thus, by base station $202_1$ and base station $202_Z$ collaborating with one another via an inter cell interference indicator, mutually agreeable non-interfering broadcast frequency patterns (e.g., $C_1$ broadcasting at a first frequency, and $A_Z$ broadcasting at a second non-interfering frequency) interference avoidance can be effectuated.

Moreover, such interference avoidance mechanisms as utilized by the claimed subject matter can additionally provide indication of access terminal or user equipment location with respect to or relative to neighboring base stations. For example, if user equipment is currently associated with cells controlled or serviced by base station $202_1$, the interference avoidance mechanisms adopted and/or effectuated by each of base station $202_1$ and/or base station $202_Z$ can provide relative location information regarding the whereabouts of user equipment relative to each of base station $202_1$ and/or base station $202_Z$. Nevertheless it should be appreciated that implementation of avoidance mechanisms on a general basis is typically not desirable for all user equipment, but can be expedient for user equipment that is subject to interference (even marginal interference) from neighboring base stations and cells under their control.

Figure 3:
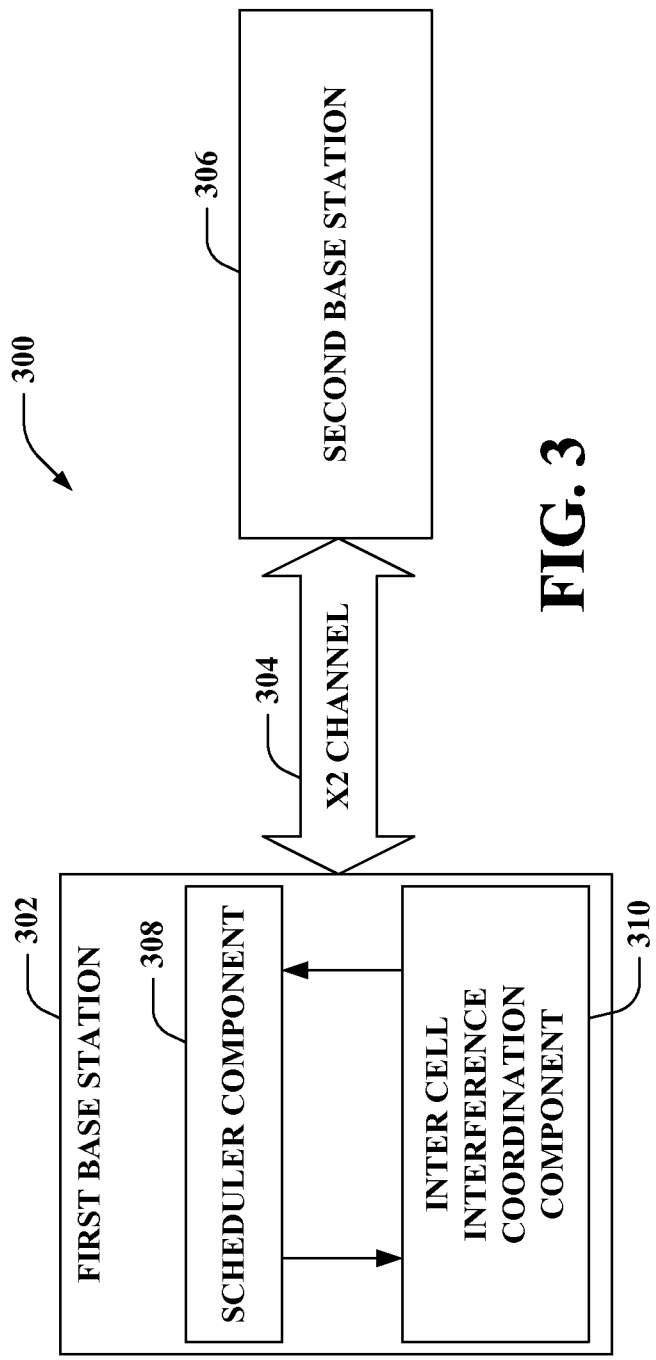
FIG. 3 is an illustration of an example system that effectuates quality of service (QoS) differentiation and/or prioritization across a plurality of base stations situated in a wireless communication environment.

Turning now to FIG. 3 that illustrates a system 300 that facilitates and/or effectuates quality of service (QoS) differentiation and/or prioritization across a plurality of base stations wherein each of the plurality of base stations are in a proximate relationship with one another such that each base station or one or more of the cells serviced or controlled by the base station can cause interference to one or more cells associated with its neighbors during the transmit and/or receive phase of operations. As depicted system 300 can include first base station 302 and second base station 306 that can be in continuous or intermittent communication via X2 channel 304. As stated above, the X2 channel 304 can provide a direct connection between first base station 302 and second base station 306, wherein first base station 302 controls or services one or more cells that are in a proximate relationship with one or more cells controlled or serviced by second base station 306 such that the proximate relationship between one or more of the cells controlled or serviced by first base station 302 causes inter cell interference to one or more of the cells controlled or service by second base station 306, or the proximate relationship between the one or more cells controlled or serviced by second base station 306 causes interference to the one or more cells controlled or serviced by first base station 302. As will be appreciated by those of moderate skill in this field of endeavor, X2 channel 304 can be connected to respective X2 interfaces (not depicted) associated with each of first base station 302 and second base station 306.

X2 channel 304, in accordance with aspects of the claimed subject matter, can be employed to provide a signaling mechanism between first base station 302 and second base station 306 to allow each of first base station 302 and second base station 306 to interchange state information about the one or more cells that they respectively control or service, wherein the state information can relate to one or more cells that are subject to a state of congestion and which is communicated in the form of an inter cell interference coordination indicator. Additionally, X2 channel 304 can also be employed to convey priority data (e.g., the current level of priority associated with a flow as well as prospective levels of priority associated with future flows) that can also be included in the inter cell coordination indicator communicated between first base station 302 and second base station 306.

In order to provide the facilities and/or functionalities of the signaling mechanism between first base station 302 and second base station 306 different implementation strategies can be employed. In accordance with one strategy, a centralized mechanism can be adopted wherein a single monolithic system wide entity coordinates resource allocation and scheduling policies that are to be utilized by each first base station 302 and second base station 306 in order to mitigate or obviate cross cell interference between cells controlled or serviced by each of first base station 302 and second base station 306. An alternative and/or additional strategy, and one that better comports with the underlying principles set forth by the Long Term Evolution (LTE) standard, is to employ a distributed or decentralized mechanism wherein each participating base station (e.g., neighboring first base station 302 and/or second base station 306) utilizes state and/or priority information included in inter cell interference coordination indicators supplied/received via X2 channel 304 in order to ameliorate the effects of interference between cells serviced or controlled by each of first base station 302 and/or second base station 306. As will be appreciated by those cognizant in this field of endeavor, such a distributed or decentralized mechanism imbues each proximate or neighboring base station and its associated cells in a peer-to-peer relationship with one another wherein no single base station or cell necessarily has overall control over the distributed or decentralized mechanism.

Accordingly and in light of the foregoing, first base station 302 can include scheduler component 308 that can utilize one or more scheduling paradigms (e.g., first-come first served, channel-dependent scheduling, round-robin, max-min fair scheduling, proportionally fair scheduling, weighted fair queuing, maximum throughput, . . . ) to ascertain how to share available radio resources to achieve as efficient a resource utilization as possible in light of quality of service (QoS) targets associated with one or more data flows that are being dispatched from one or more cells controlled or serviced by first base station 302. Scheduler component 308 can further provide indication as to the highest priority flow or Radio Bearer that is currently in congestion within a cell controlled or serviced by first base station 302. A state of congestion typically can occur within a cell when and if any one of the quality of service (QoS) targets (e.g., delay, guaranteed bit rate, . . . ) for a congested flow is consistently not being met. Thus, in addition to scheduling data flows to satisfy quality of service (QoS) targets, scheduler component 308 can also provide congestion metrics associated with those data flows that do not comport with their respective quality of service (QoS) targets, and can, from these non complicit data flows, further identify the highest priority data flows that, at any instant in time, are subject to the worst congestion (e.g., the highest priority data flow that consistently does not satisfy its own respective quality of service (QoS) target).

As is typical, scheduler component 308 can effectuate resource allocations that mitigate or obviate cell interference between cells controlled or serviced by the same base station. For instance, referring back to FIG. 2, scheduler component 308 included in base station $202_1$ can ensure that resource allocations within cells $204_1$ (e.g., $A_1, B_1, C_1, \ldots$) controlled or serviced by base station $202_1$ are complementary so that interference between cell $A_1$ and cells $B_1$ and $C_1$ is mitigated, interference between cell $B_1$ and cells $A_1$ and $C_1$ is mitigated, and/or interference between cell $C_1$ and cells $A_1$ and $B_1$ is similarly mitigated. Such mitigation or obviation of cell interference between cells controlled or serviced by the same base station can be brought into effect by scheduler component 308 taking into account the respective data flows and/or quality of service (QoS) targets associated with such data flows and allocating resources in such a manner that avoids conflicts between the cells controlled or serviced by the same base station. For example, scheduler 308 can direct cell $A_1$ to utilize a first frequency to broadcast its data flow, can direct cell $B_1$ to employ a second frequency to broadcast its data flow, and direct cell $C_1$ to use a third frequency to broadcast its data flows so that each of the respective data flows in cells $A_1$, $B_1$, and $C_1$ can satisfy their quality of service (QoS) targets.

Moreover, scheduler component 308 can also effectuate resource allocations that can mitigate or obviate cell interference between cells controlled or serviced by different but proximate or neighboring base stations (e.g., first base station 302 and second base station 306). In this instance, scheduler component 308 in concert with inter cell interference coordination component 310 can take measures to facilitate interference avoidance based at least in part on information supplied/received from one or more proximate base stations via X2 channel 304. For example, scheduler component 308, based at least in part on the respective data flows and/or quality of service (QoS) criteria associated with the cells controlled or serviced by the base station (e.g., first base station 302) in which scheduler component 308 is included and/or information supplied/received from the one or more proximate base stations via the X2 channel 304, can adopt resource allocation strategies that facilitates interference avoidance with cells controlled or serviced by neighboring base stations (e.g., second base station 306). For instance, scheduler component 308 can ascertain that data flows associated with cell $C_1$ controlled by first base station 302 are of a lower priority than data flows associated with cell $A_Z$ controlled by second base station 306. In recognition of the fact that the data flows associated with cell $C_1$ are of a relatively lower priority than those being broadcast in cell $A_Z$, scheduler component 308 can modify the resource allocations in cell $C_1$ to allow cell $A_Z$ to broadcast its higher priority traffic. One illustrative resource allocation scheme that can be utilized by scheduler component 308 to facilitate the foregoing can be to ensure that broadcast of the lower priority flows in cell $C_1$ is carried out at a non interfering frequency with regard to the frequency at which cell $A_Z$ is broadcasting its higher priority traffic. A further illustrative resource allocation scheme that can be implemented by scheduler component 308 to ensure that broadcast of the lower priority flows in cell $C_1$ controlled or serviced by first base station 302 does not interfere with the higher priority flows in cell $A_Z$ serviced or controlled by second base station 306, is for scheduler component 308 to direct cell $C_1$ to broadcast its lower priority data flows at a first power level while the higher priority flows in cell $A_Z$ controlled or serviced by second base station 306 are being broadcast at a second power level, wherein the first power level and the second power level are non interfering with one another.

As will be appreciated by those moderately conversant in this field of endeavor, second base station 306 can also include a scheduler component that can be configured and operable in a manner as that expounded upon in connection with scheduler component 308, and as such can provide reciprocal functionalities and/or facilities to those elucidated above. Thus, the scheduler component included in second base station 306 can in conjunction with an inter cell interference coordination component also included with second base station 306 can implement resource allocation schemes that are consonant with the resource allocation schemes implemented by scheduler component 308 included in first base station 302. For example, when scheduler component 308 included in first base station 302 implements a resource allocation for low priority data flows being broadcast by cell $C_1$, in recognition that data flows being broadcast by cell $A_Z$ have a relatively higher priority, the scheduler component included in second base station 306 can direct cell $A_Z$ to broadcast its higher priority data flows using a different resource allocation so as to avoid interference with the broadcast of the lower priority data flows being broadcast by cell $C_1$. For instance, the scheduler component associated with second base station 306 can direct cell $A_Z$ to broadcast its higher data flows at a first power level on the understanding (e.g., communicated by first base station 302 to second base station 306 via X2 channel 304) that scheduler 308 included with first base station 302 will direct cell $C_1$ to broadcast its lower priority data flows at a second power level. As will be apparent to those reasonably cognizant in this field of endeavor, the first power level utilized by cell $A_Z$ to broadcast its higher priority data flows can be selected by the scheduler component associated with second base station 306 so that the selected first power level does not interfere with broadcast of the lower priority data flow by cell $C_1$ at the second power level selected by scheduler component 308 associated with first base station 302.

As will be appreciated by those of reasonable cognition in this field, scheduler component 308 in concert with, or based at least in part on, feedback or feed forward from inter cell interference coordination component 310 can selectively utilize resource blocks or power levels in preference to other resource blocks or power levels in order to obviate or mitigate cross-cell interference wherein the cross-cell interference is attributable to two or more cells controlled or serviced by different proximately situated base stations such as first base station 302 and second base station 306. Moreover, as will be further appreciated scheduler component 308 can effectuate pattern coordination whereon each scheduler component included in participating base stations can dynamically and over time gravitate to a mutually beneficial agreement as how best to broadcast their highest priority congested data flows in cells controlled by a first base station and subject to interference from cells controlled or serviced by a second neighboring base station. By ensuring that there is mutual collaboration between neighboring base stations regarding the broadcast of congested data flows in cells subject to interference from other cells controlled or serviced by other neighboring base stations, efficiency and throughput gains can be accrued.

Further, included in first base station 302 can be inter cell interference coordination component 310 that can continuously and/or periodically monitor the activities partaken by scheduling component 308 regarding the resource allocation mix utilized by scheduling component 308 in servicing data flows in the various cells controlled by first base station 302 in order for data flows to satisfy their respective quality of service (QoS) targets. Inter cell interference coordination component 310 can also monitor whether or not quality of service (QoS) targets for data flows within cells controlled or serviced by first base station 302 are being met, and from this information can determine or ascertain which of the cells are failing to satisfy their quality of service (QoS) targets and therefore can be considered congested. Moreover, inter cell interference coordination component 310 can also ascertain from these congested cells which data flow has the highest priority.

Additionally, inter cell interference coordination component 310 can also provide a conciliation aspect wherein input received or solicited from scheduler component 308 and information acquired or obtained (e.g., via X2 channel 304) from a plurality of neighboring base stations can be employed to provide indication to scheduler component 308 of the respective priorities and/or congestion experienced by data flows in cells controlled or serviced by the neighboring base stations. Scheduler component 308 can utilize such information or input to modify the resource allocations in cells controlled by the base station in which scheduler component 308 is included, where there are conflicts with cells controlled or serviced by one or more neighboring base station. For example, if it is ascertained from information received via X2 channel 304 that cell $A_Z$ controlled or serviced by second base station 306 is attempting to broadcast a high priority data flow but is currently subject to congestion (e.g., the quality of service (QoS) targets for the data flow in cell $A_Z$ are consistently not being met), and it is further determined that the current resource allocations provided by scheduler component 308 to cell $C_1$ controlled or serviced by first base station 302 in broadcasting its lower priority data flow are inimical to the broadcast of the high priority data flow in cell $A_Z$, then inter cell interference coordination component 310 can direct scheduler component 308 to adjust its resource allocation mix for cell $C_1$ so that the higher priority data flow in cell $A_Z$ controlled or serviced by second base station 306 is able to more closely adhere to it associated quality of service (QoS) targets. It should be noted that when the foregoing is implemented both the high priority data flow being broadcast from cell $A_Z$ and the relatively lower priority data flow being broadcast from cell $C_1$ can see benefit in that resource allocations implemented by each of the scheduler components included in first base station 302 and second base station 306 respectively can be complementary to one another. For instance, the scheduler component associated with second base station 306 can selectively choose to broadcast the higher priority data flow in cell $A_Z$ at a first power level, whereas scheduler component 308 included with first base station 302 can selectively choose to broadcast the lower priority data flow in cell $C_1$ at a first frequency. In this manner, through mutual collaboration between first base station 302 and second base station 306 and use of corresponding inter cell interference coordination components, interference that was previously experienced by data flows in cell $A_Z$ and cell $C_1$ can be avoided or at the very least mitigated.

Furthermore, inter cell interference coordination component 310 can also include a dispatch aspect that can construct an inter cell interference coordination indicator that can subsequently be dispatched or disseminated over X2 channel 304 to one or more neighboring base stations. The inter cell interference coordination indicator can range from a single bit to a plurality of bits. Nevertheless, typically the number of bits included in the inter cell interference coordination indicator constructed by inter cell interference coordination component 310 is sufficient to convey one priority level (e.g., the number of bits necessary to convey at least one 3GPP priority level), but as will be appreciated the claimed subject matter is not necessarily so limited. Moreover, the inter cell interference coordination indicator can be constructed by inter cell interference coordination component 310 at any time when there is a change in the highest priority level of a congested data flow or when the per-physical resource block bit pattern is adjusted. Additionally, inter cell interference coordination indicator construction can be triggered based at least in part on other considerations not necessarily tied to quality of service (QoS) considerations.

As will be appreciated by those moderately cognizant in this field of endeavor, second base station 306 can also be provisioned with a similar scheduler component 308 and inter cell interference coordination component 310 which can operate in manners similar to those elucidated above in connection with first base station 302. Moreover, it should further be noted, without limitation or loss of generality, that the neighbor relationship between first base station 302 and second base station 306 is typically defined by the vendor specific implementation of the X2 channel hookups between the base stations. Thus, for example, first base station 302 and second base station 306 can be a few meters from one another so much so that the cells (and the data flows passing through such cells) controlled or serviced by each of first base station 302 and second base station 306 can be in common opposition to one another (e.g., there is constant and/or persistent interference between cells controlled by first base station 302 and second base station 306), or first base station 302 and second base station 306 can be many kilometers apart such that data flows passing through cells controlled or serviced by first base station 302 and second base station 306 can infrequently, if ever, come into direct conflict with one another. Nevertheless, as will be appreciated by those of moderate proficiency in this field of endeavor, interference coordination and/or interference avoidance is typically focused on more proximate neighbors rather than far neighbors, and one or more network measurements can be employed to differentiate between far neighbors and more proximate and/or interfering neighbors.

Figure 4:
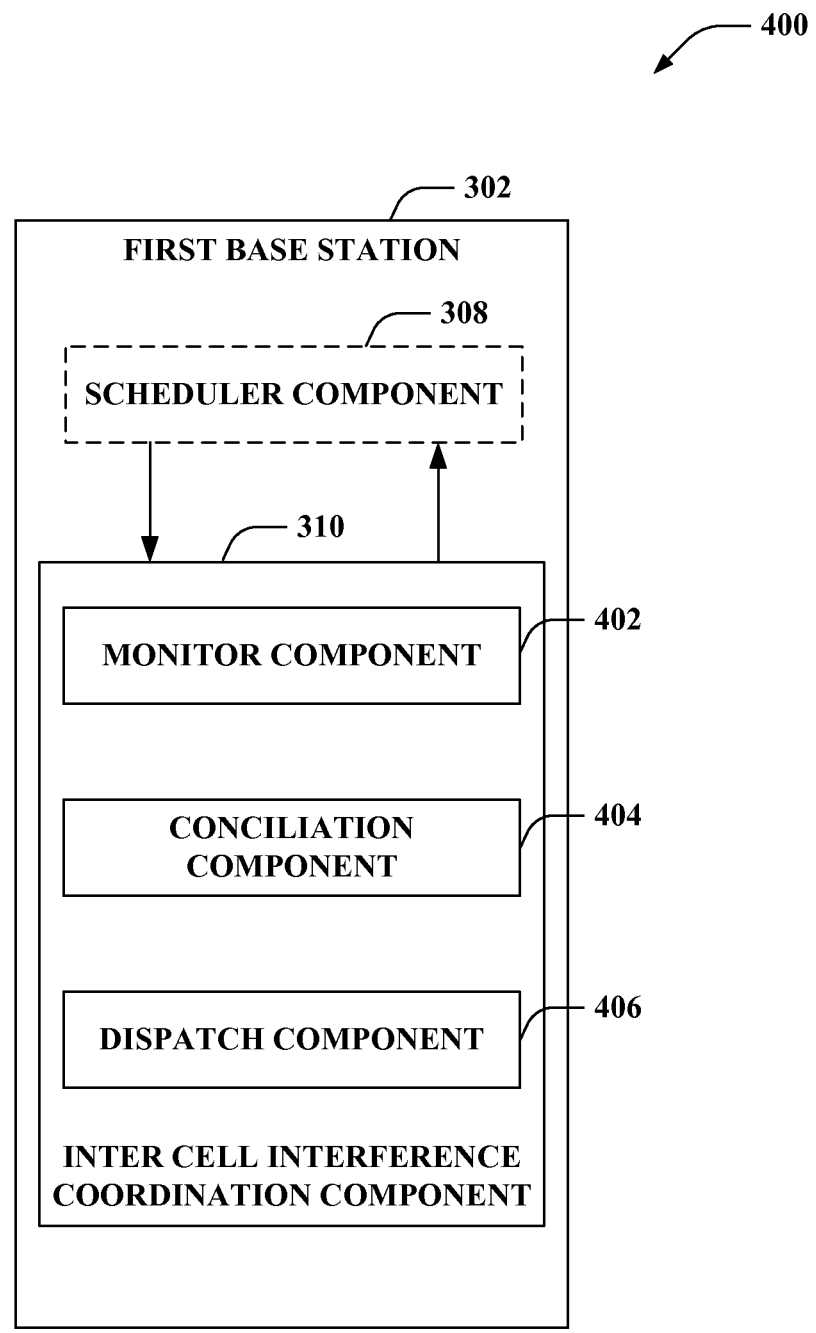
FIG. 4 is an illustration of an example system that effectuates quality of service (QoS) differentiation and/or prioritization across a plurality of base stations situated in a wireless communication environment.

FIG. 4 provides a more detailed depiction 400 of first base station 302, and more particularly a more detailed depiction of inter cell interference coordination component 310. As illustrated, inter cell interference component 310 can include monitor component 402 that can continuously and/or periodically monitor the scheduling activities of scheduler component 308 to determine or ascertain the resource allocations made by scheduler component 308 with respect to cells controlled or serviced by first base station 302 and whether or not quality of service (QoS) targets are being met in relation to data flows passing through those cells associated with first base station 302. From this information, monitor component 402 can ascertain whether or not data flows passing through cells controlled or serviced by first base station 302 are satisfying their respective quality of service (QoS) targets. Where monitor component 402 establishes that one or more data flows traversing through one or more cells are failing to satisfy their quality of service (QoS) targets, monitor component 402 can consider such a finding as indication that the data flows in these cells are currently subject to congestion. Moreover, monitor component 402 can also ascertain from each of these congested cells the highest priority data flow within the congested cell that is subject to such congestion.

Inter cell interference coordination component 310 can also include conciliation component 404 that can utilize information provided by or solicited from monitor component 402, scheduler component 308, and/or information acquired or obtained via X2 channel 304 from one or more neighboring base stations (e.g., second base station 306) to provide feedback or feed forward to scheduler component 308 of the respective priorities and/or congestion being experience by data flows in cells associated with the one or more neighboring base stations. The information supplied by conciliation component 404 to scheduler component 308 can be utilized by scheduler component 308 to modify resource allocations in cells controlled or serviced by the base station (e.g., first base station 302) in which scheduler component 308 is situated so that interference between conflicting cells (e.g., cells controlled or serviced by first base station 302 and second base station 306) are more complementary with one another. For instance, based at least in part on information received from conciliation component 404, scheduler component 308 can effect resource allocations that do not conflict with resource allocations that can have been effected by a scheduler component associated with a disparate neighboring base station controlling cells that are in conflict with cells controlled or serviced by first base station 302.

Additionally, inter cell interference coordination component 310 can also include dispatch component 406 that can assemble an inter cell interference coordination indicator that can be sent via X2 channel 304 to neighboring base stations. Dispatch component 406 can assemble or construct the inter cell interference coordination indicator as a series of bits sufficient to indicate at least one priority level (e.g., the priority level of the highest priority data flow subject to congestion in a particular cell controlled or serviced by first base station 302). Dispatch component 406 can undertake assembly and dispatch of the inter cell interference coordination indicator when there is a change in the highest priority level of a congested data flow, or when the per-physical block bit pattern is adjusted, for example. Further, dispatch component 406 can also undertake construction and dissemination of inter cell interference coordination indicators based on considerations other than considerations related to quality of service (QoS) criteria. Once dispatch component 406 has constructed the inter cell interference coordination indicator, it can send the inter cell interference coordination indicator via the X2 channel to neighboring base stations, wherein the inter cell interference coordination indicator can be utilized by similarly configured scheduler components and/or inter cell interference coordination components associated or included with the neighboring base stations.

Figure 5:
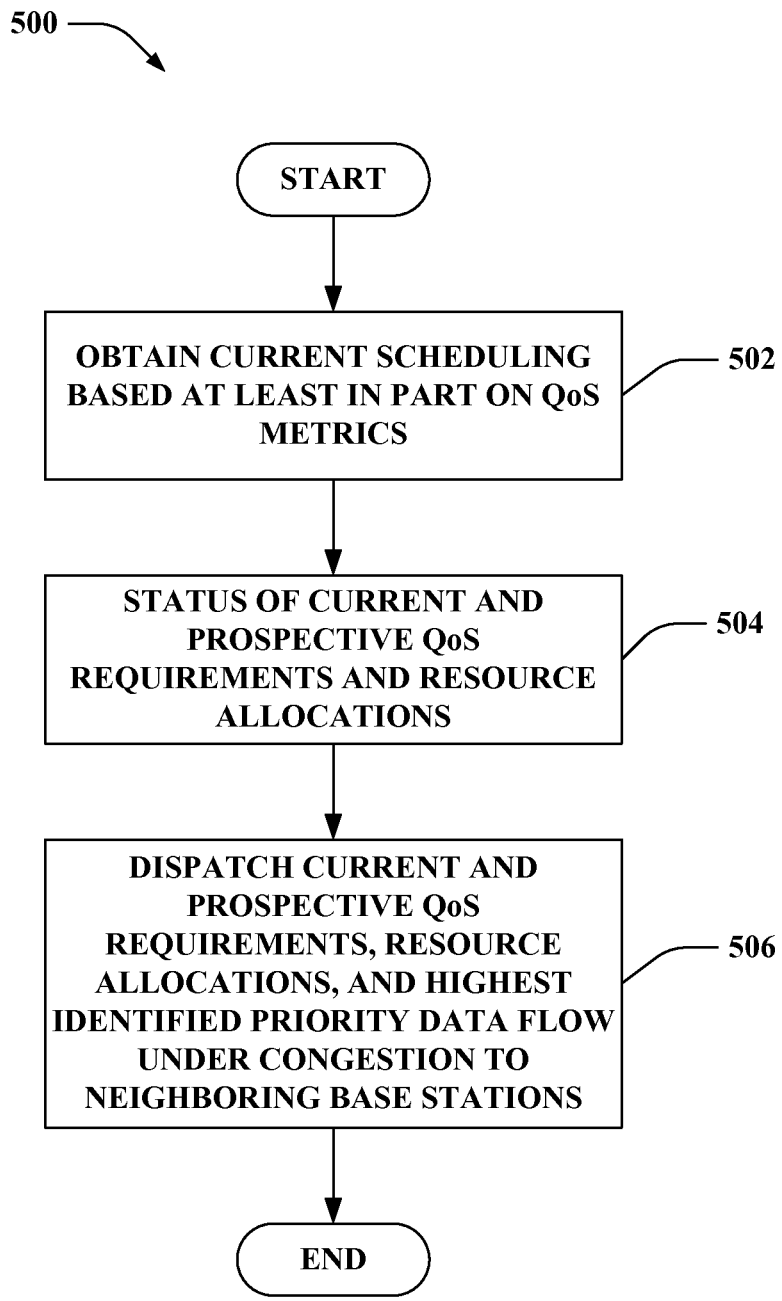
FIGS. 5-7 illustrate example methodologies that facilitate quality of service (QoS) differentiation and/or prioritization across one or more neighboring base stations in accordance with aspects of the claimed subject matter.
Figure 6:
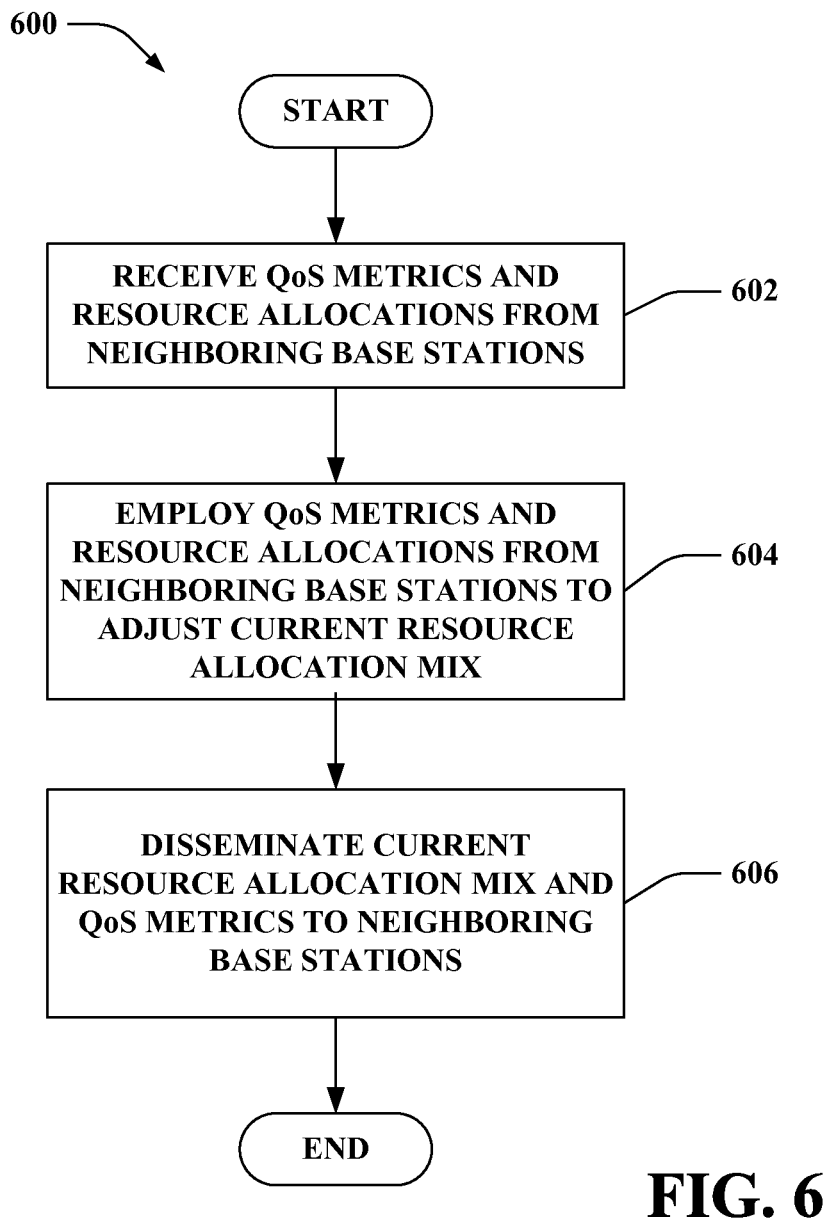
Figure 7:
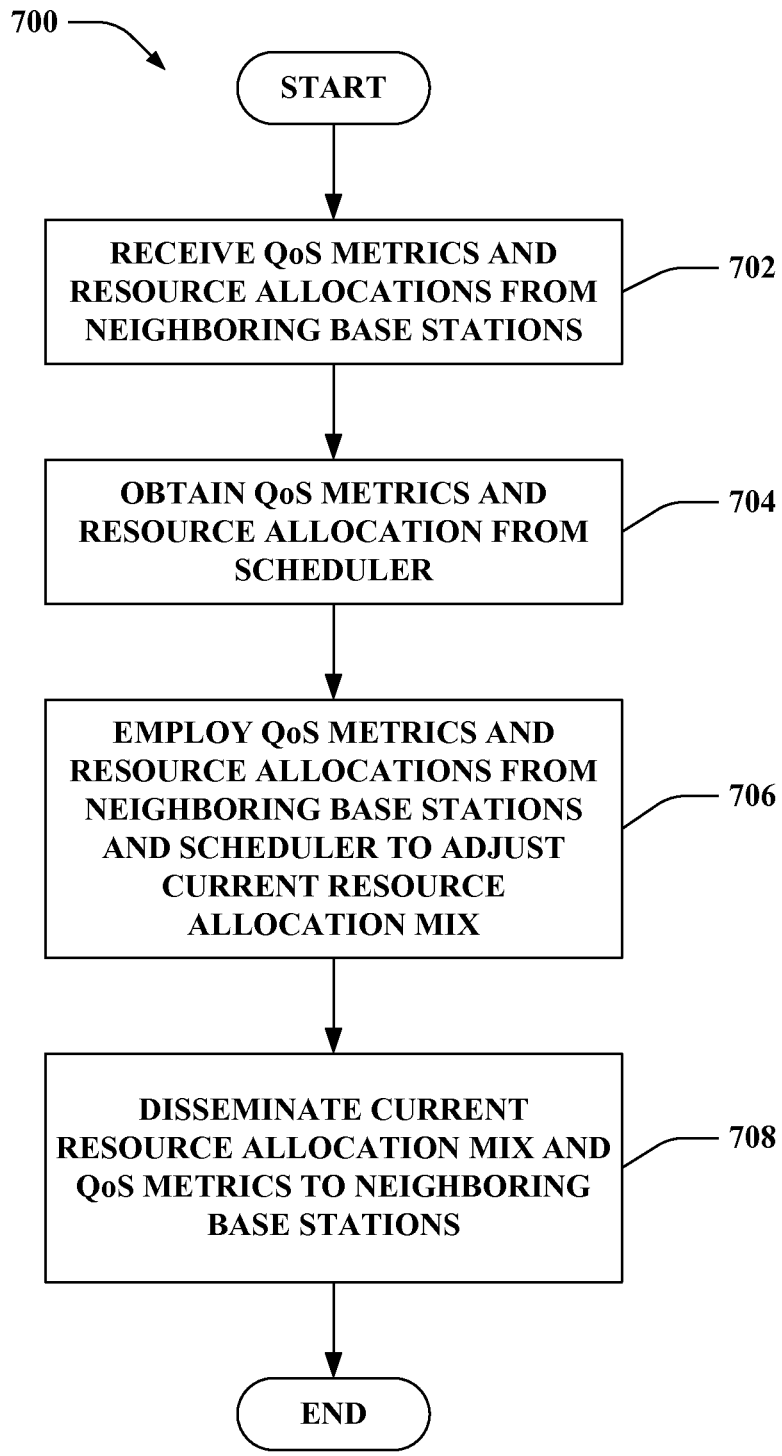

Referring to FIGS. 5-7, methodologies relating to effectuating quality of service (QoS) differentiation and/or prioritization across a plurality of base stations in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 5, illustrated therein is a methodology 500 that effectuates quality of service (QoS) differentiation and/or prioritization across a plurality of base stations in accordance with an aspect of the claimed subject matter. Methodology 500 can commence at 502 where current resource allocations to one or more cells controlled by a base station can be obtained wherein the resource allocations have been made based at least in part on quality of service (QoS) metrics associated with data flows traversing through the one or more cells controlled by the base station. At 504 methodology 500 can ascertain whether current and/or prospective quality of service (QoS) requirements/targets are being, or can be, met by the current resource allocations. Where at 504 if it is observed that quality of service (QoS) requirements/targets for data flows passing through the one or more cells is not being met a state of congestion can be noted for those data flows and further an ordering can be carried out so that the highest priority data flow can be identified. At 506 the current and prospective quality of service (QoS) targets/requirements, resource allocations, and/or highest identified priority data flow under congestion can be dispatched to neighboring base stations (e.g., via an X2 channel) as a bit or series of bits in an inter cell interference coordination indicator.

FIG. 6 illustrates a further methodology 600 that facilitates and/or effectuates quality of service (QoS) differentiation and/or prioritization across a plurality of base stations in accordance with an aspect of the claimed subject matter. Methodology 600 can commence at 602 where quality of service (QoS) metrics, resource allocations, and other pertinent information related to the highest identified priority data flow that is in a state of congestion in a particular cell controlled by a neighboring base station can be received. At 604 the information received at 602 can be utilized (e.g., directed to a scheduling aspect/component) to adjust the resource allocation mix to one or more cells controlled or serviced by the receiving base station, and in particular, the resource allocation mix can be adjusted so as to ensure that the highest priority data flow under congestion in a cell associated with or controlled by a neighboring base is able to satisfy its quality of service (QoS) target. At 606 the current resource allocation mix, the quality of service (QoS) metrics, and/or highest identified priority data flow under congestion in one or more cells controlled or serviced by the receiving base station can be disseminated to neighboring base stations as a bit, or series of bits, in an inter cell interference coordination indicator.

FIG. 7 illustrates another methodology 700 that effectuates quality of service (QoS) differentiation and/or prioritization across a plurality of base stations in accordance with an aspect of the claimed subject matter. Methodology 700 can commence at 702 where quality of service (QoS) metrics, resource allocations, and information pertaining to the highest identified priority flow that is in a state of congestion in a particular cell controlled or serviced by a neighboring base station can be received. It should be noted without limitation or loss of generality, that in the information received at 702 can be received by way of an inter cell interference coordination indicator (e.g., as a bit or series of bits sufficient to convey at least the highest priority data flow that is in a state of congestion). At 704 quality of service (QoS) metrics and resource allocations that have been made in furtherance meeting quality of service (QoS) targets for particular data flows in one or more cells controlled or serviced by the receiving base station can be obtained from the scheduler. At 706 the quality of service (QoS) metrics, resource allocations, and information relating to the highest identified priority flow that is in a state of congestion in a particular cell controlled or serviced by neighboring base stations, as well as resource allocations, quality of service (QoS) metrics, and information relating to the highest identified priority flow that is in a state of congestion in cells controlled or serviced by the receiving base station can be utilized to direct a scheduler associated with the receiving base station to adjust the current resource allocation mix so that at least one of the highest identified priority data flow that is in a state of congestion in cells controlled or serviced by the receiving base station or the highest identified priority data flow that is in a state of congestion in cells controlled or serviced by one or more of the neighboring base stations is able to satisfy its quality of service targets. At 708 the re-adjusted resource allocation mix effectuated by the scheduler associated with the receiving base station, the highest identified priority data flow that is currently in a state of congestion in cells controlled by the receiving base station, and/or the quality of service (QoS) metrics associated with the various data flows traversing through cells controlled or serviced by the receiving base station can be disseminated, via a X2 channel/interface couplet, to neighboring base stations as a inter cell interference coordination indicator (e.g., as a bit or series of bits that at least conveys to the neighboring base station the highest priority data flow that is in a state of congestion in the receiving base station—the base station on which methodology 700 is running).

It will be appreciated that, in accordance with one or more aspects described herein, inferences can be made regarding selecting or choosing appropriate resource allocation mixes in light of congested data flows traversing through cells controlled by a local base station and/or a proximate or neighboring remote base station. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
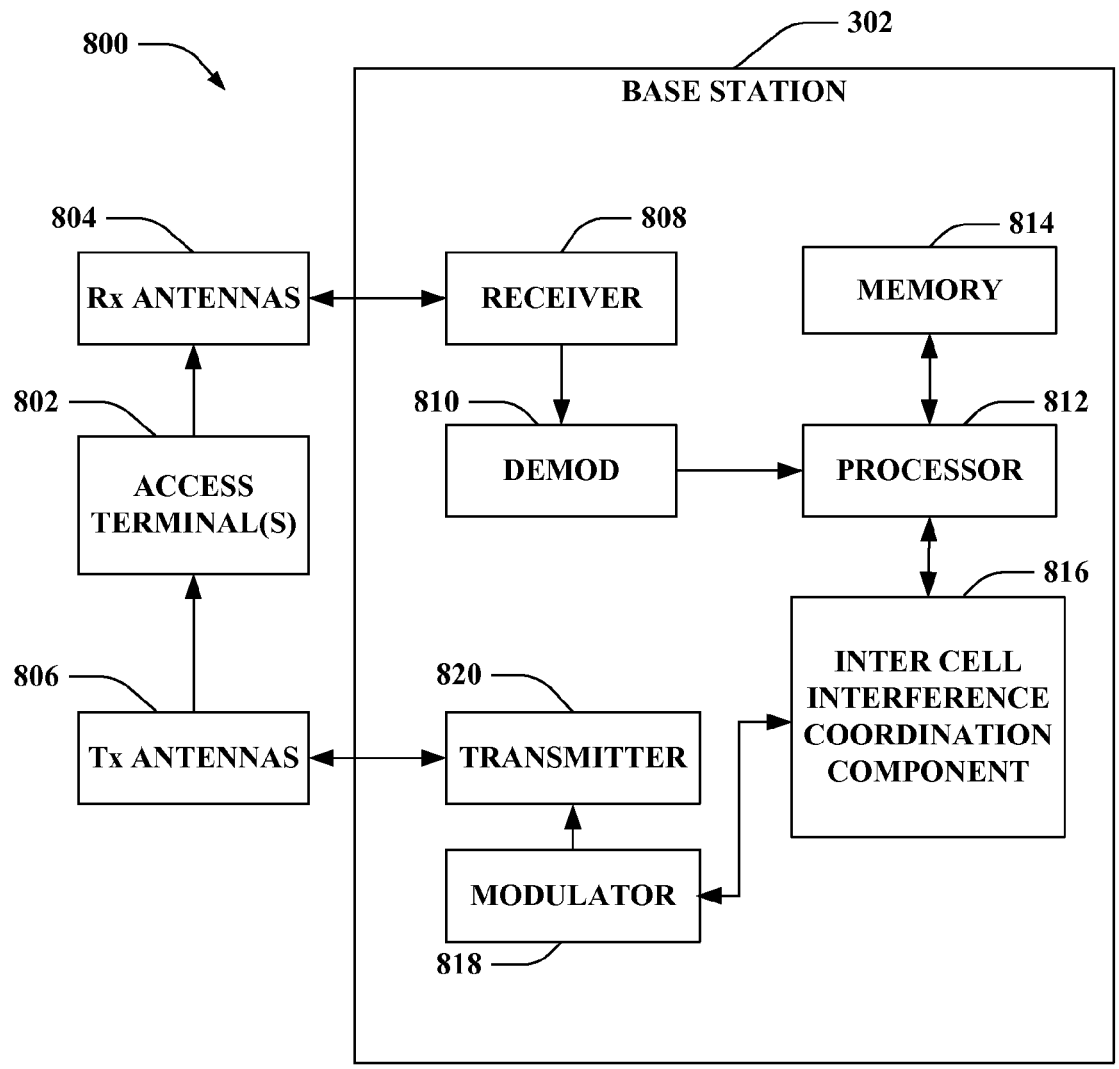
FIG. 8 is an illustration of an example system that facilitates quality of service (QoS) differentiation and/or prioritization across a plurality of base stations situated in a wireless communication environment.

FIG. 8 is an illustration of a system 800 that facilitates transmitting circuit switched voice over packet switched networks. System 800 comprises a base station 302 (e.g., access point, . . . ) with a receiver 808 that receives signal(s) from one or more access terminals 802 through a plurality of receive antennas 804, and a transmitter 820 that transmits to the one or more access terminals 802 through a transmit antenna 806. Receiver 808 can receive information from receive antennas 804 and is operatively associated with a demodulator 810 that demodulates received information. Demodulated symbols are analyzed by a processor 812 dedicated to analyzing information received by receiver 808 and/or generating information for transmission by a transmitter 820, a processor that controls one or more components of base station 302, and/or which is coupled to a memory 814 that stores data to be transmitted to or received from access terminal(s) 802 (or a disparate base station (not shown)) and/or any other suitable information related to performing the various actions and functions set forth herein. Processor 812 is further coupled to a inter cell interference coordination component 816 that facilitate transmission of inter cell interference coordination indicators over packet switched networks. Further, inter cell interference coordination component 816 can provide information to be transmitted to a modulator 818. Modulator 818 can multiplex a frame for transmission by a transmitter 820 through antennas 806 to access terminal(s) 802. Although depicted as being separate from the processor 812, it is to be appreciated that inter cell interference coordination component 816 and/or modulator 818 can be part of processor 812 or a number of processors (not shown).

Figure 9:
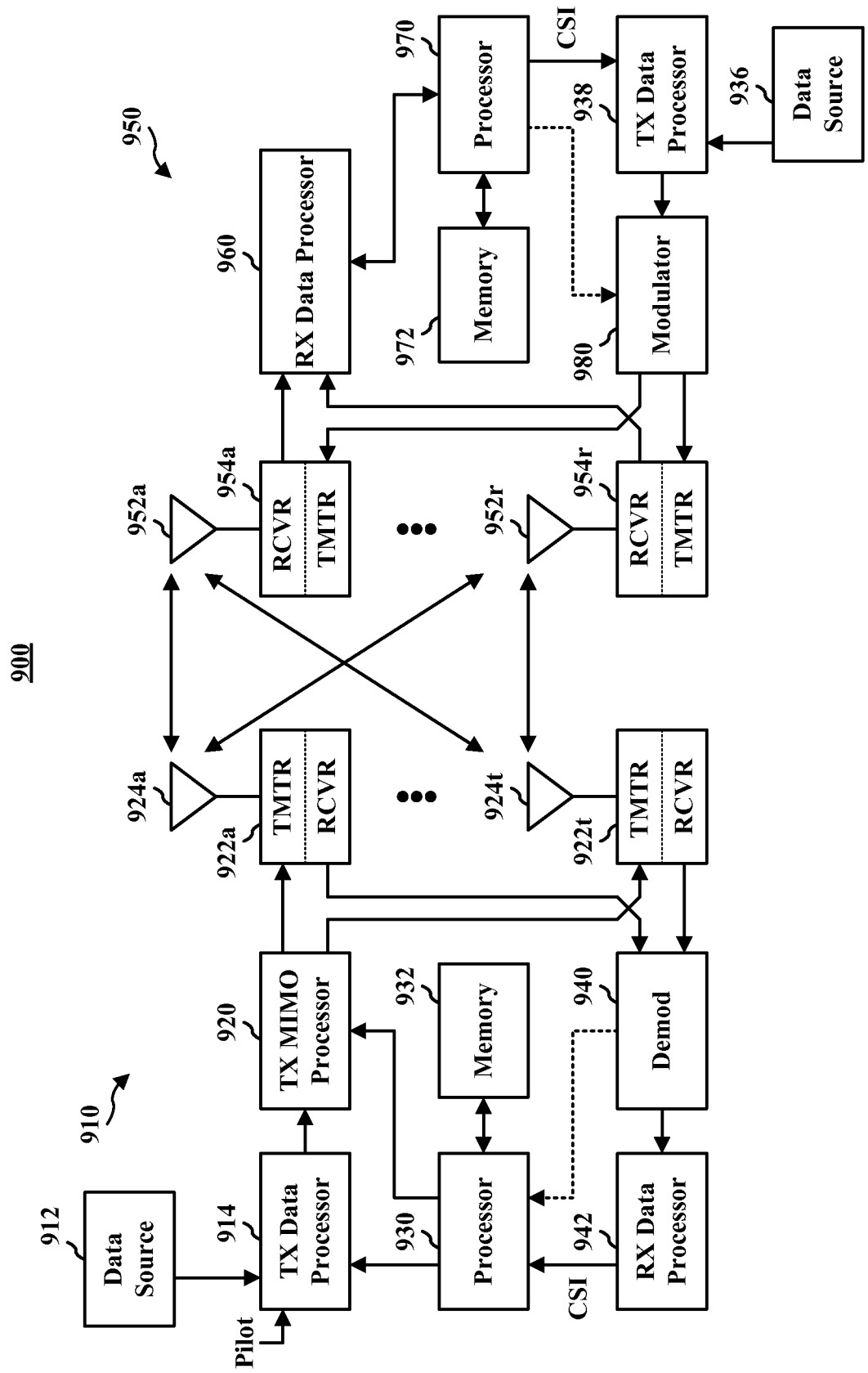
FIG. 9 is an illustration of an example wireless network environment that can be employed in conjunction with the various systems and methods described herein.

FIG. 9 shows an example wireless communication system 900. The wireless communication system 900 depicts one base station 910 and one access terminal 950 for sake of brevity. However, it is to be appreciated that system 900 can include more than one base station and/or more than one access terminal, wherein additional base stations and/or access terminals can be substantially similar or different from example base station 910 and access terminal 950 described below. In addition, it is to be appreciated that base station 910 and/or access terminal 950 can employ the systems (FIGS. 1-4) and/or methods (FIGS. 5-7) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At access terminal 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which available technology to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from access terminal 950 are received by antennas 924, conditioned by receivers 922, demodulated by a demodulator 940, and processed by a RX data processor 942 to extract the reverse link message transmitted by access terminal 950. Further, processor 930 can process the extracted message to determine which precoding matrix to use for determining the beamforming weights.

Processors 930 and 970 can direct (e.g., control, coordinate, manage, etc.) operation at base station 910 and access terminal 950, respectively. Respective processors 930 and 970 can be associated with memory 932 and 972 that store program codes and data. Processors 930 and 970 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
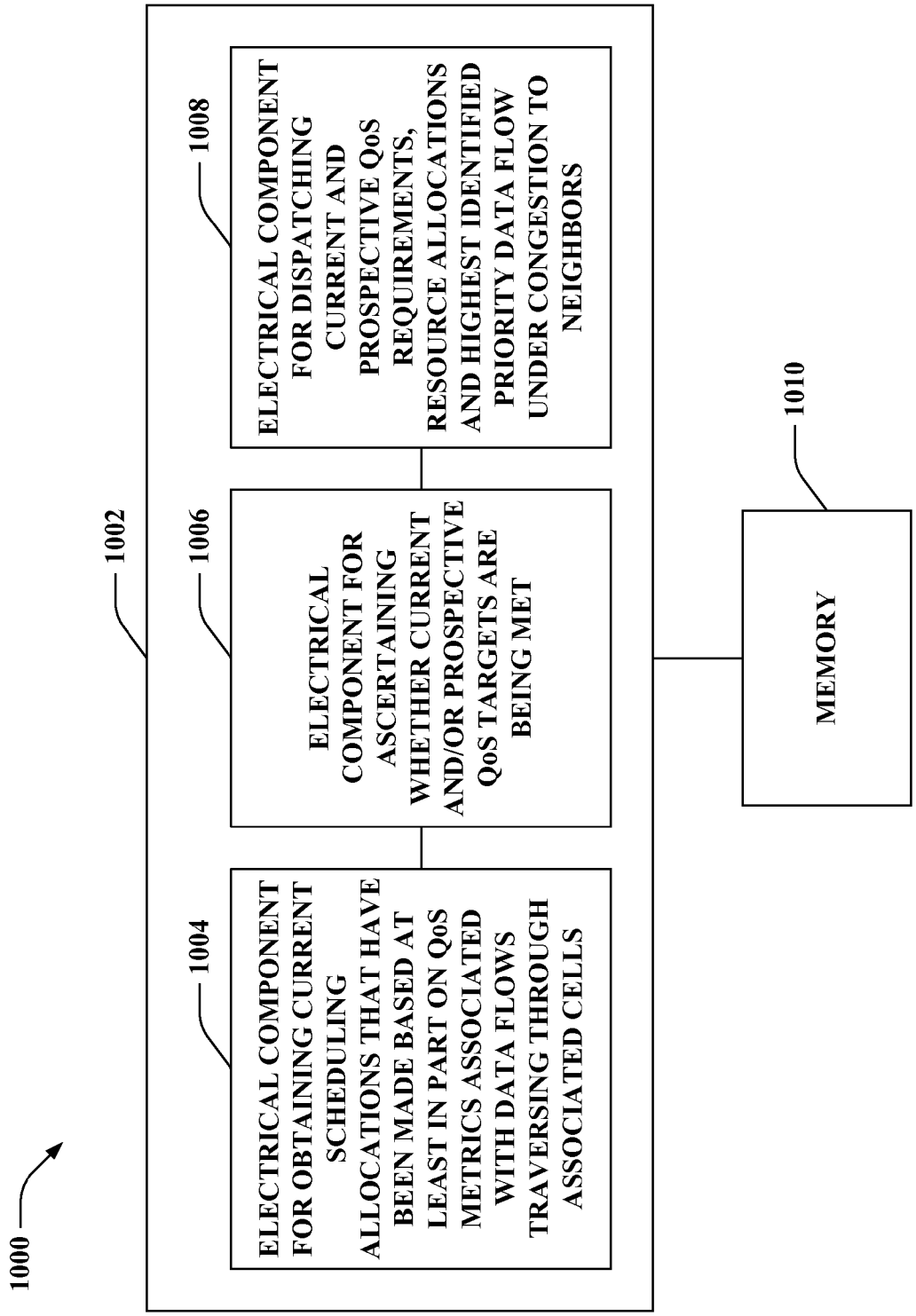
FIG. 10 is an illustration of an example system that enables utilizing quality of service (QoS) differentiation and/or prioritization across one or more neighboring base stations in a wireless communication environment.

With reference to FIG. 10, illustrated is a system 1000 that effectuates quality of service (QoS) differentiation and/or prioritization across a plurality of base stations in a wireless communication environment. For example, system 1000 can reside at least partially within a base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for obtaining or soliciting current scheduling resource allocations that have been made based at least in part on quality of service (QoS) metrics associated with data flows traversing through associated cells 1004. Further, logical grouping 1002 can include an electrical component for ascertaining whether current and/or prospective quality of service (QoS) targets within the associated cells are being satisfied or met 1006. Moreover, logical grouping 1002 can comprise an electrical component for dispatching current and prospective quality of service (QoS) requirements, resource allocations, and the highest identified congested priority data flow to neighboring base stations via an inter cell interference coordination indicator 1008. For example, the indication can be transferred over a control channel (e.g., Physical Downlink Control Channel (PDCCH), X2 channel, . . . ). Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
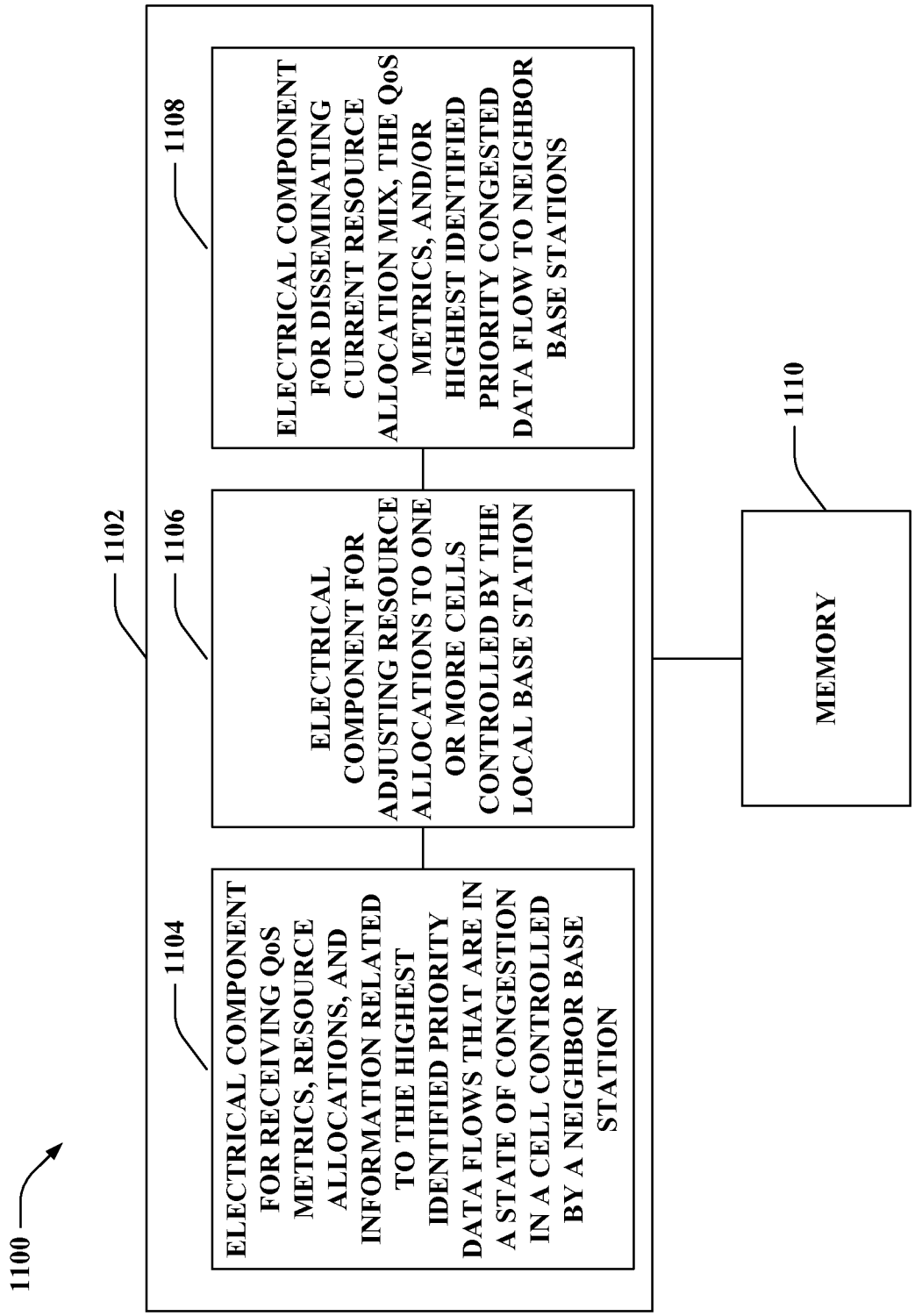
FIG. 11 is an illustration of an example system that enables utilizing quality of service (QoS) differentiation and/or prioritization across one or more neighboring base stations in a wireless communication environment.

With reference to FIG. 11, illustrated is a system 1100 that effectuates quality of service (QoS) differentiation and/or prioritization across a plurality of base stations in a wireless communication environment. For example, system 1100 can reside at least partially within a base station. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving QoS metrics, resource allocations, and/or information related to the highest identified priority data flows that are in a state of congestion in a cell controlled by a neighboring base station 1104. Further, logical grouping 1102 can include an electrical component for adjusting resource allocations to one or more cells controlled by the local or receiving base station 1106. Moreover, logical grouping 1102 can comprise an electrical component for disseminating current resource allocation mix, the quality of service (QoS) metrics, and/or the highest identified congested data flow within the receiving or local base station to neighboring base stations via an inter cell interference coordination indicator 1108. For example, the indication can be transferred over a control channel (e.g., Physical Downlink Control Channel (PDCCH), X2 channel, . . . ). Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus operable in a wireless communication system, the apparatus comprising:
a processor, configured to obtain a current resource allocation for one or more cells controlled by a first base station, ascertain whether the current resource allocation satisfies a quality of service target associated with a data flow traversing through at least one of the one or more cells controlled by the first base station, dispatch an inter cell interference coordination indicator to a second base station, and utilize an inter cell interference coordination indicator received from the second base station to modify the current resource allocation to a cell controlled by the first base station to avoid interference with a cell serviced by the second base station; and
a memory coupled to the processor for persisting data.

2. The apparatus of claim 1, wherein the current resource allocation of the one or more cells controlled by the first base station based at least in part on the quality of service target associated with data flows traversing through at least one of the one or more cells.

3. The apparatus of claim 1, the processor further configured to dispatch the inter cell interference coordination indicator to the second base station when a state of congestion associated with a highest priority data flow associated with at least one of the one or more cells changes.

4. The apparatus of claim 1, the processor further configured to dispatch the inter cell interference coordination indicator to the second base station when a physical resource block allocation associated with at least one of the one or more cells changes.

5. The apparatus of claim 1, wherein the inter cell interference coordination indicator received from the second base station is utilized to mitigate data flow congestion experienced by at least one of the cells controlled by the first base station or the cell serviced by the second base station.

6. The apparatus of claim 1, wherein the inter cell interference coordination indicator received from the second base station is employed to adjust the current resource allocation to the cell controlled by the first base station by broadcasting at a first frequency where the cell serviced by the second base station broadcasts at a second frequency, the first frequency and second frequency are non-interfering.

7. The apparatus of claim 1, wherein the inter cell interference coordination indicator received from the second base station is utilized to adjust the current resource allocation to the cell controlled by the first base station by utilizing a first power level where the cell serviced by the second base station employs a second power level, the first power level and the second power level are distinct.

8. The apparatus of claim 1, wherein the inter cell interference coordination indicator received from the second base station is employed to identify a highest priority data flow traversing through at least one of a cell controlled by the first base station or a cell controlled by the second base station and based at least on the highest priority data flow identified, adjusting the current resource allocation to the cell that includes the highest priority data flow to broadcast at a highest power level or adjusting the current resource allocation to the cell that includes lower priority data flows to broadcast at lower power levels.

9. The apparatus of claim 1, wherein the inter cell interference coordination indicator received from the second base station is utilized to identify a highest priority data flow traversing through at least one of a cell controlled by the first base station or a cell controlled by the second base station and based at least on the highest identified priority flow, adjusting the current resource allocation to the cell that includes the highest priority data flow to broadcast at a first frequency and a highest power level or adjusting the current resource allocation to the cell that includes lower priority data flows to broadcast at the first frequency and at a lower power level.

10. The apparatus of claim 1, wherein the inter cell interference coordination indicator conveyed to the second base station through an X2 channel that connects the first base station with the second base station.

11. The apparatus of claim 10, wherein the X2 channel that connects the first base station with the second base station defines a neighbor relationship between the first base station and the second base station.

12. The apparatus of claim 1, the processor further configured to construct the inter cell interference coordination indicator, the inter cell interference coordination indicator includes at least one bit to convey at least one priority level associated with a data flow that is in a state of congestion in at least one of the one or more cells controlled by the first base station.

13. A method utilized in wireless communication systems, the method comprising:
soliciting a current resource allocation for one or more cells controlled by a first base station;
ascertaining whether the current resource allocation satisfies a quality of service target associated with a data flow traversing through at least one of the one or more cells controlled by the first base station;
disseminating an inter cell interference coordination indicator to a second base station; and
employing an inter cell interference coordination indicator received from the second base station to modify the current resource allocation to a cell controlled by the first base station to avoid interference with a cell serviced by the second base station.

14. The method of claim 13, wherein the current resource allocation of the one or more cells controlled by the first base station based at least in part on the quality of service target associated with the data flow traversing through at least one of the one or more cells.

15. The method of claim 13, further comprising distributing the inter cell interference coordination indicator to the second base station when a state of congestion associated with a highest priority data flow associated with at least one of the one or more cells changes.

16. The method of claim 13, further comprising sending the inter cell interference coordination indicator to the second base station when a physical resource block allocation associated with at least one of the one or more cells changes.

17. The method of claim 13, wherein the disseminating the inter cell interference coordination indicator to the second base station includes utilizing an X2 channel that connects the first base station with the second base station.

18. The method of claim 13, further comprising building the inter cell interference coordination indicator, the inter cell interference coordination indicator includes at least one bit to convey at least one priority level associated with a data flow that is in a state of congestion in at least one of the one or more cells controlled by the first base station.

19. An apparatus operable in a wireless communication system, the apparatus comprising:
a memory that retains instructions related to obtaining a resource allocation for one or more cells controlled by a first base station, ascertaining whether the resource allocation satisfies a quality of service target associated with a data flow traversing through at least one of the one or more cells controlled by the first base station, dispatching an inter cell interference coordination indicator to a second base station, and employing an inter cell interference coordination indicator received from the second base station to modify the current resource allocation to a cell controlled by the first base station to avoid interference with a cell serviced by the second base station; and
a processor, coupled to the memory, configured to execute the instructions retained in memory.

20. The apparatus of claim 19, wherein the resource allocation of the one or more cells controlled by the first base station based at least in part on the quality of service target associated with the data flow traversing through at least one of the one or more cells.

21. The apparatus of claim 19, the memory further retains instructions related to conveying the inter cell interference coordination indicator to the second base station when a state of congestion associated with a lowest priority data flow associated with at least one of the one or more cells changes.

22. The apparatus of claim 19, the memory further retains instructions related to directing the inter cell interference coordination indicator to the second base station when a physical resource block allocation associated with at least one of the one or more cells changes.

23. The apparatus of claim 19, wherein the dispatching the inter cell interference coordination indicator to the second base station utilizes an X2 channel that connects the first base station with the second base station.

24. The apparatus of claim 19, the memory further retains instructions related to assembling the inter cell interference coordination indicator, the inter cell interference coordination indicator includes at least one bit to convey at least one priority level associated with a data flow that is in a state of congestion in at least one of the one or more cells controlled by the first base station.

25. An apparatus operable in wireless communication systems, the apparatus comprising:
 means for obtaining a current resource allocation for one or more cells controlled by a first base station;
 means for ascertaining whether the current resource allocation satisfies a quality of service target associated with a data flow traversing through at least one of the one or more cells controlled by the first base station;
 means for dispatching an inter cell interference coordination indicator to a second base station; and
 utilizing an inter cell interference coordination indicator received from the second base station to modify the current resource allocation to a cell controlled by the first base station to avoid interference with a cell serviced by the second base station.

26. The apparatus of claim 25, the means for dispatching conveys the inter cell interference coordination indicator to the second base station when a state of congestion associated with a highest priority data flow associated with at least one of the one or more cells changes.

27. The apparatus of claim 25, the means for dispatching communicates the inter cell interference coordination indicator to the second base station when a physical resource block allocation associated with at least one of the one or more cells changes.

28. The apparatus of claim 25, the means for dispatching utilizes an X2 channel that connects the first base station with the second base station to direct the inter cell interference coordination indicator to the second base station.

29. A computer-program product, comprising:
 a non-transitory computer-readable medium comprising:
  code for obtaining a current resource allocation for one or more cells controlled by a first base station;
  code for ascertaining whether the current resource allocation satisfies a quality of service target associated with a data flow traversing through at least one of the one or more cells controlled by the first base station;
  code for communicating an inter cell interference coordination indicator to a second base station; and
  code for utilizing an inter cell interference coordination indicator received from the second base station to modify the current resource allocation to a cell controlled by the first base station to avoid interference with a cell serviced by the second base station.

30. The computer-program product of claim 29, wherein the code for communicating further comprises code for conveying the inter cell interference coordination indicator to the second base station when a state of congestion associated with a highest priority data flow associated with at least one of the one or more cells changes.

31. The computer-program product of claim 29, wherein the code for communicating further comprises code for sending the inter cell interference coordination indicator to the second base station when a physical resource block allocation associated with at least one of the one or more cells changes.

32. The computer-program product of claim 29, wherein the code for communicating further comprises code for employing an X2 channel that connects the first base station with the second base station to direct the inter cell interference coordination indicator to the second base station.

33. The apparatus of claim 1, wherein the inter cell interference coordination indicator indicates a priority of the data flow.

34. The apparatus of claim 33, wherein the priority of the data flow corresponds to the first base station.

35. The apparatus of claim 1, wherein the data flow is in a state of congestion.

* * * * *